United States Patent Office 2,892,674
Patented June 30, 1959

2,892,674

TREATMENT OF CELLULOSIC MATERIALS

Robert Sause and William Elliot Stephen, Manchester, England, assignors to Imperial Chemical Industries Limited, London, England, a corporation of Great Britain No Drawing. Application May 21, 1956
Serial No. 585,957

Claims priority, application Great Britain May 27, 1955

16 Claims. (Cl. 8—116.2)

This invention relates to the treatment of cellulosic materials with water-soluble halogeno-1:3:5-triazine derivatives in order to confer thereon improved properties, including affinity for basic dyestuffs.

It has already been proposed, for example in British Specification No. 342,167, to treat cellulosic materials with alkali and then with solutions in organic liquids of cyanuric halides in order to confer thereon an affinity for basic dyestuffs.

It is an object of the present invention to provide a process for the treatment of cellulosic materials with non-dyestuff halogeno-1:3:5-triazine derivatives in aqueous media.

It is a further object of this invention to confer upon cellulosic materials a valuable affinity for certain basic dyestuffs, namely dyestuffs solubilised by cationic groups and more particularly dyestuffs that contain isothiouronium salt groups attached through methylene linkages to aromatic nuclei, as described, for example, in British Patent Nos. 576,270, 587,636 and 613,980.

According to the present invention there is provided a process for the modification of cellulosic materials which comprises treating cellulosic materials under aqueous alkaline conditions with a non-dyestuff compound, or a mixture of such compounds, containing at least one 1:3:5-triazine ring the carbons of which carry as substituents at least one halogen atom and at least one residue of a primary or secondary amine bound via the nitrogen atom thereof and containing at least one negatively charged solubilising group.

The halogeno-1:3:5-triazine compounds used in the process of this invention may conveniently be prepared by reacting a cyanuric halide, advantageously the chloride, with a primary or secondary amine containing at least one negatively charged solubilising group, under conditions such that at least one halogen atom remains attached to the triazine ring. Suitable conditions for such reactions are well known from the literature. Thus, for example, an aqueous solution of one molecular proportion of an alkali metal salt of a primary or secondary monoamine containing at least one negatively charged solubilising group may be added gradually to an aqueous suspension of one molecular proportion of cyanuric chloride at 0–5° C., the reaction medium being subsequently neutralised so as to give a pH of 6–7. If desired, the resulting primary condensation product so obtained may be further reacted at a suitable higher temperature, for example at 30–40° C., with a molecular proportion of the same or different primary or secondary amine containing at least one negatively charged solubilising group or of a suitable primary or secondary amine devoid of such negatively charged groups with simultaneous or subsequent neutralisation of any acidity which is developed during the reaction to give secondary condensation products.

The said primary or secondary amine containing at least one negatively charged solubilising group may be a diamine and this may be reacted with cyanuric chloride in such amounts as allow of a di-primary condensation product to be formed and the latter may be further condensed with one or two molecular proportions of a primary or secondary amine which may or may not contain a negatively charged solubilising group.

As examples of negatively charged solubilising groups we mention sulphonic and carboxylic acid groups.

Thus cyanuric chloride may be reacted with monoamines such as for example m- and p-aminobenzene sulphonic acids, 2-amino-8-naphthol-6-sulphonic acid, 2-naphthylamine-4:8-disulphonic acid, 2-naphthylamine-6:8-disulphonic acid, p-aminobenzoic acid, taurine, N-methyl-taurine or N-phenylglycine to give primary condensation products wherein the primary or secondary amine is bound to a carbon atom of the triazine ring via its nitrogen atom or with diamines such as for example p-phenylenediaminesulphonic acid, m-phenylenediamine-sulphonic or 4:4-diaminostilbene-2:2'-disulphonic acid to give di-primary condensation products.

In place of the cyanuric chloride there may be used di-chlorsubstituted 1:3:5-triazines wherein the substituent on the remaining carbon may be the residue of a primary or secondary amine, bound via the nitrogen atom, which amine may or may not contain a negatively charged solubilising group, for example the residue of metanilic acid, sulphanilic acid, methylamine, ethylamine, diethylamine, monoethanolamine, diethanolamine, p-phenylenediamine carboxylic acid, anthranilic acid and the like, or a group —OR wherein R stands for a low molecular weight alkyl group, for example methyl or ethyl, or for aryl of the benzene series, for example phenyl, p-methylphenyl, p-sulphophenyl or p-carboxyphenyl.

The process of this invention may be performed by treating the cellulosic materials with an alkaline aqueous solution or suspension of the 1:3:5-triazine compound by the usual processes of padding and drying, or the 1:3:5-triazine compound may be applied from aqueous solution or suspension, and alkali may be applied from a separate bath, before or after the application of the 1:3:5-triazine compound, if desired with an intermediate drying stage. After the treatment, the cellulosic material may be washed with water or with dilute acid and finally dried. The alkali used is conveniently sodium hydroxide, but other alkaline agents can be used, for example sodium carbonate.

Any cellulosic material can be treated according to the process of this invention; most valuable results are obtained when the material treated is viscose rayon or acetate rayon. In such cases the material is endowed with an especially valuable affinity for basic dyestuffs and particularly for dyestuffs solubilised by cationic groups. These dyestuffs can be used for colouring the treated cellulosic materials, for example by printing processes, and there are then obtained stronger and more level prints than is the case with untreated materials. The printing of the treated viscose or acetate rayon with dyestuffs solubilised by cationic groups forms a preferred further feature of this invention.

The invention is illustrated but not limited by the following examples in which parts and percentages are by weight except when otherwise stated.

*Example 1*

Spun viscose is padded with an aqueous solution containing 3% of the primary condensation product from one molecular proportion of cyanuric chloride and one molecular proportion of p-aminobenzene sulphonic acid, and 3% of sodium hydroxide.

The cloth so treated is dried by application of heat, rinsed in water and again dried before printing with dyestuffs solubilised by cationic groups. Prints so obtained are much stronger and more level than those obtained with untreated fabric.

Cotton pretreated in a similar manner yields smoother and stronger prints when compared with untreated material.

*Example 2*

Spun viscose is first padded with an aqueous solution containing 3% of the primary condensation product from one molecular proportion of cyanuric chloride and one molecular proportion of p-aminobenzene sulphonic acid and then dried by application of heat.

The cloth so treated is after-padded with an aqueous solution of 3% sodium hydroxide and 30% common salt, rinsed in water and dried, before printing with dyestuffs solubilised by cationic groups. Results obtained are similar to those of Example 1.

*Example 3*

Spun viscose is first padded with 3% aqueous sodium hydroxide and then with a 3% aqueous solution of the primary condensation product from one molecular proportion of cyanuric chloride and one molecular proportion of p-aminobenzene sulphonic acid.

The cloth so treated is dried by application of heat, rinsed in water and again dried before printing with dyestuffs solubilised by cationic groups. Improved prints are thus obtained.

*Example 4*

Spun viscose is padded and dried according to Examples 1, 2 or 3, then steamed for 15 minutes, rinsed in water and dried before printing. Prints so obtained are slightly deeper in shade and also duller than those of Examples 1, 2 and 3, and the whites are slightly stained.

*Example 5*

Examples 1 to 4 are repeated with the modification that rinsing with water is replaced by padding with dilute hydrochloric acid or acetic acid. Similar prints to those in Examples 1-4 are obtained.

*Example 6*

Examples 1 to 4 are repeated with the modification that rinsing with water is omitted. The still alkaline, dry cloth is printed directly with dyestuffs solubilised by cationic groups. This method, though yielding good prints, leads to slight discolouration of the whites.

*Example 7*

The di-primary condensation product obtained from 2 molecular proportions of cyanuric chloride and 1 molecular proportion of p-phenylenediamine sulphonic acid, prepared as described below, is applied to spun viscose in the manner described in Examples 1-6. Results obtained with this compound are similar to those cited in Examples 1-6.

The said di-primary condensation product used in this example may be prepared as follows: A solution of 18.5 parts of cyanuric chloride in 100 parts of acetone is poured into a stirred mixture of 300 parts of water and 300 parts of crushed ice. To the suspension of cyanuric chloride so formed there is added during 50 minutes a solution containing 10.5 parts of the sodium salt of p-phenylenediamine sulphonic acid in 300 parts of water, the temperature of the mixture being kept at 0° to 4° C. during and after this addition. The mixture is subsequently stirred for 1 hour after which time it is gelatinous in appearance and reacts acid to Congo red paper. Sufficient 2 N sodium carbonate solution is added to adjust the pH of the solution to 7 as shown by testing with Universal Indicator paper and then sufficient common salt is added to give a 20% solution on a weight/volume basis. After stirring the mixture for another ½ hour the product is filtered off, the filter cake is slurried with a solution containing 3.15 parts of potassium dihydrogen phosphate and 1.8 parts of disodium hydrogen phosphate in 20 parts of water and the resulting suspension is then filtered. The filter cake is finally dried at ordinary temperature.

*Example 8*

The product obtained by the condensation of 1 molecular proportion of cyanuric chloride and 1 molecular proportion of 2-amino-8-naphthol-6-sulphonic acid is applied to spun viscose fabric by the methods described in Examples 1-6. Prints thereon with dyestuffs solubilised by cationic groups yield slightly duller shades and adjacent whites are slightly more stained.

*Example 9*

The product obtained by the condensation of 1 molecular proportion of cyanuric chloride and 1 molecular proportion of 2-naphthylamine-4:8-disulphonic acid is applied to spun viscose in the manner described above. Prints thereon with basic dyes, particularly such as are solubilised with cationic groups, are superior to those of Examples 1-8 from the same dyestuffs. Cotton fabric treated in a similar way yields prints with dyestuffs solubilised by cationic groups which are superior to those on untreated cotton.

*Example 10*

The condensation product from 1 molecular proportion of cyanuric chloride and 1 molecular proportion of 2-naphthylamine-6:8-disulphonic acid, applied to spun viscose as described above, yields prints slightly superior to those obtained with the same dyestuffs on spun viscose which has been treated with the condensation product employed in Example 9.

The condensation product from 1 molecular proportion of cyanuric chloride and 1 molecular proportion of 2-naphthylamine-6:8-disulphonic acid used in this example may be prepared as follows: A solution of 18.5 parts of cyanuric chloride in 100 parts of acetone is poured into a stirred mixture of 300 parts of water and 300 parts of crushed ice. To the suspension of cyanuric chloride so formed is added in 30 minutes a solution of 34.7 parts of disodium 2-naphthylamine-6:8-disulphonate in 200 parts of water keeping the temperature of the mixture between 0° and 4° C. After the addition is complete the mixture is stirred for another ½ hour and then 2 N sodium carbonate solution is added gradually until the pH of the medium is between 6 and 7 as shown by testing with Universal Indicator paper. Sufficient salt to give a strength of 10% on a weight/volume basis and 1.4 parts of disodium hydrogen phosphate and 2.5 parts of potassium dihydrogen phosphate are then added and the mixture is stirred for another 1 hour and then filtered. The product is dried at ordinary temperature.

*Example 11*

The condensation product obtained from 1 molecular proportion of cyanuric chloride and 1 molecular proportion of p-aminobenzoic acid is applied to spun viscose fabric in the manner described in the previous examples. Prints thereon with dyestuffs solubilised by cationic groups are superior to those obtained with the same dyestuffs on untreated viscose fabric.

*Example 12*

The condensation product of 2 molecular proportions of 2-β-hydroxyethylamino-4:6-dichloro - 1:3:5 - triazine and 1 molecular proportion of p:p'-diaminostilbene disulphonic acid is used as a 3% suspension according to the processes described in Examples 1 and 2. The prints obtained on spun viscose show bright shades and brilliant whites.

Example 13

Spun viscose and mercerised satin are padded with an aqueous solution containing 3% of the condensation product from 1 molecular proportion of cyanuric chloride and 1 molecular proportion of p-aminobenzene sulphonic acid and 3% sodium hydroxide, dried by application of heat and rinsed in water.

The fibre so treated is dried and printed with Victoria Blue B (Colour Index No. 729). The prints are soaped for 1 minute at 50° C. They show much increased fixation of dyestuff as compared with prints obtained with the same dyestuff on untreated material.

Example 14

The condensation product obtained from 1 molecular proportion of cyanuric chloride and 1 molecular proportion of 1-naphthylamine-4:6:8-trisulphonic acid is applied to spun viscose fabric in the manner described in previous examples. Prints thereon with dyestuffs solubilised by cationic groups yield prints slightly superior to those obtained in Examples 9 and 10.

Example 15

The reaction product obtained from 1 molecular proportion of cyanuric chloride and 1 molecular proportion of benzidine-2:2'-disulphonic acid is applied to spun viscose in the manner described in Example 1. Prints thereon with dyestuffs solubilised by cationic groups are superior to those obtained with the same dyestuffs on untreated viscose fabric.

Example 16

The reaction product of 1 molecular proportion of cyanuric chloride and 2 molecular proportions of benzidine-2:2'-disulphonic acid is applied to viscose in the manner described in Example 1. Prints thereon with dyestuffs solubilised by cationic groups are superior to those obtained with the same dyes on untreated fabric.

Example 17

The condensation product of 1 molecular proportion of 2-naphthylamine-6-sulphonic acid and 1 molecular proportion of cyanuric chloride is applied to spun viscose fabric in the manner described in Example 1. Prints and dyeings thereon with dyestuffs solubilised by cationic groups are superior to those obtained with the same dyes on untreated fabric.

Example 18

The condensation product of 1 molecular proportion of 2:4-dichloro-6-methoxy-1:3:5-triazine and one molecular proportion of 2-naphthylamine-6:8-disulphonic acid is applied to spun viscose in the manner described in Example 1. Prints thereon with dyestuffs solubilised by cationic groups are superior to those obtained with the same dyes on untreated fabric.

The condensation product used in this example may be prepared as follows:

18.4 parts of 2:4-dichloro-6-methoxy-1:3:5-triazine are dissolved in 75 parts of acetone and the solution so formed is poured into a stirred mixture of 300 parts of water and 300 parts of crushed ice. To the suspension thus produced is added in 15 minutes a neutral solution containing 34.7 parts of disodium-2-naphthylamine-6:8-disulphonate in 130 parts of water and the mixture is afterwards stirred for 15 minutes, and the temperature is raised to 35° C. and so maintained until the reaction is finished. This is brought about by the gradual addition of sodium carbonate solution in sufficient quantity of produce slight alkalinity to litmus paper in the aqueous medium. A solution containing 4.2 parts of disodium hydrogen phosphate and 7.5 parts of potassium dihydrogen phosphate in 100 parts of water is then added to the reaction mixture and after stirring for 15 minutes the condensation product is precipitated by the addition of common salt. It is filtered off, washed with saturated brine solution and dried at ordinary temperature.

What we claim is:

1. A process for the modification of cellulosic textile materials which comprises impregnating cellulosic materials selected from the group consisting of natural cellulose, regenerated cellulose and cellulose acetate in the presence of aqueous alkali with an aqueous solution of a non-dyestuff compound having the formula

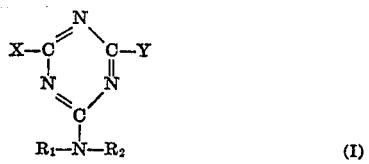

(I)

where X is a halogen atom, Y is a radical selected from the group consisting of halogen, lower alkoxy, phenoxy, lower alkyl phenoxy, an amino radical containing up to 4 carbon atoms and

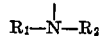

$R_1$ is a radical selected from the group consisting of hydrogen, methyl and phenyl and $R_2$ is a radical selected from the group consisting of methylene and ethylene radicals carrying a negatively charged salt forming group; phenyl, naphthyl, diphenylyl and stilbene radicals carrying $n$ negatively charged solubilizing groups; and phenyl, naphthyl, diphenylyl and stilbene radicals carrying $n$ negatively charged solubilizing groups together with a further substituent selected from the group consisting of hydroxy, —$NHR_1$ and

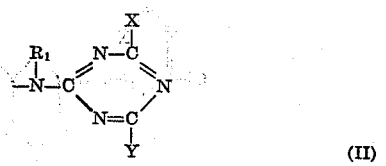

(II)

where $n$ is an integer from 1 to 3, and $R_1$, X and Y have the same significance as in the aforementioned structural Formula I, and in each instance said negatively charged solubilising groups are selected from the class consisting of carboxylic and sulfonic acid radicals, and thereafter drying the textile materials.

2. The process of claim 1 wherein the said compound is

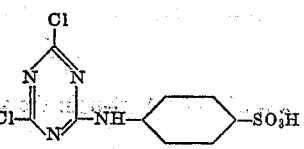

3. The process of claim 1 wherein the said compound is

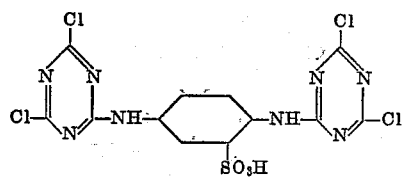

4. The process of claim 1 wherein the said compound is

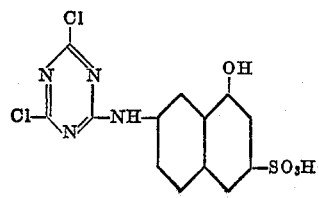

5. The process of claim 1 wherein the said compound is

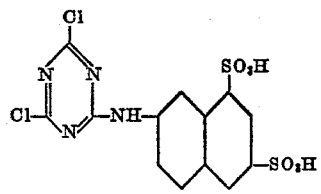

6. The process of claim 1 wherein the said compound is

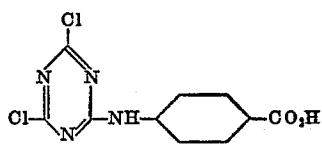

7. The process of claim 1 wherein the said compound is

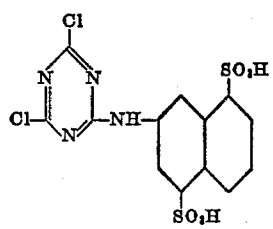

8. The process of claim 1 wherein the said compound is

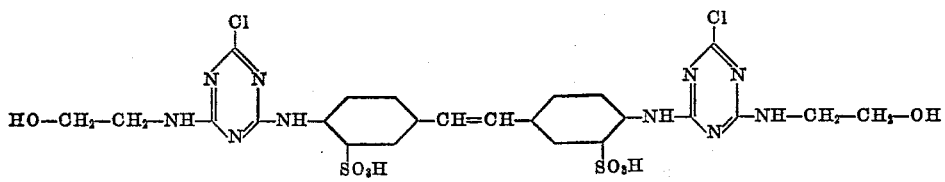

9. The process of claim 1 wherein the said compound is

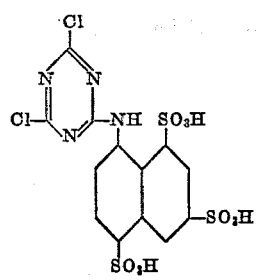

10. The process of claim 1 wherein the said compound is

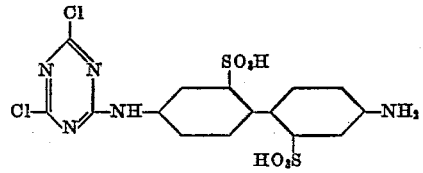

11. The process of claim 1 wherein the said compound is

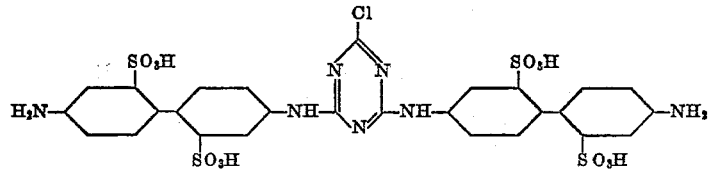

12. The process of claim 1 wherein the said compound is

13. The process of claim 1 wherein the said compound is

14. A process for coloring cellulosic textile materials prepared according to claim 1 which comprises printing said materials with dyestuffs solubilised by salt forming cationic groups.

15. The process of claim 14 wherein said dyestuff is Victoria Blue B, corresponding to C. I. Number 44045.

16. The process of claim 14 wherein said dyestuff contains an isothiouronium salt group bound to the aromatic nuclei of the dyestuff through methylene linkage.

References Cited in the file of this patent

UNITED STATES PATENTS 2,300,589    Nelles _____ Nov. 3, 1942

FOREIGN PATENTS 342,167    Great Britain _____ Jan. 29, 1931

OTHER REFERENCES

Warren et al.: "Textile Research Journal," vol. 27, No. 9, September 1952, pp. 584–590.